Aug. 16, 1955 — E. MORROW — 2,715,224
GOGGLES WITH LENS MOUNTED SIDE SHIELDS
Filed March 27, 1953
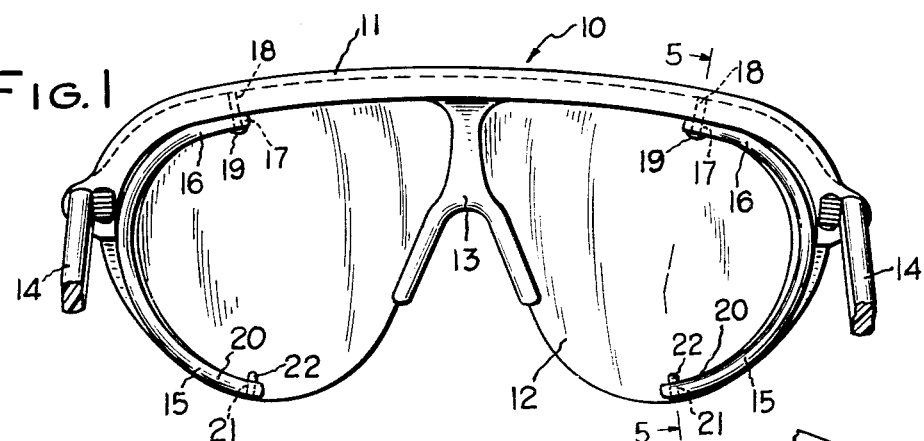
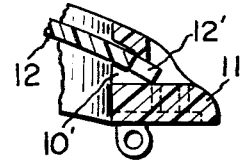
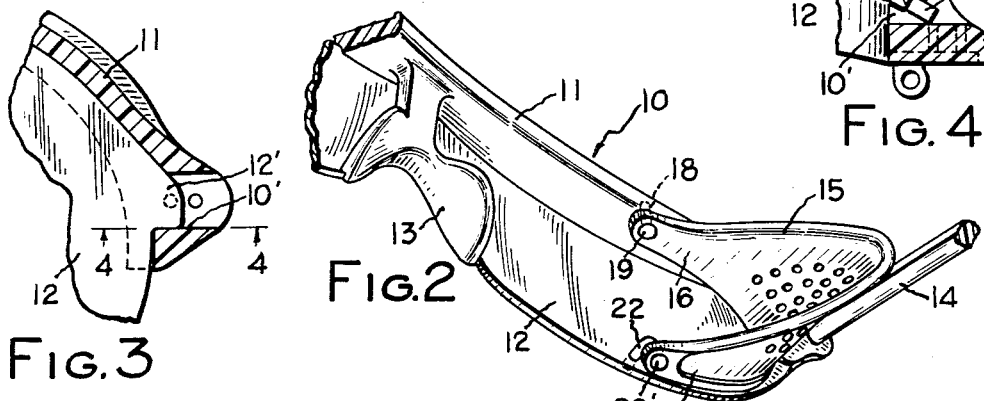
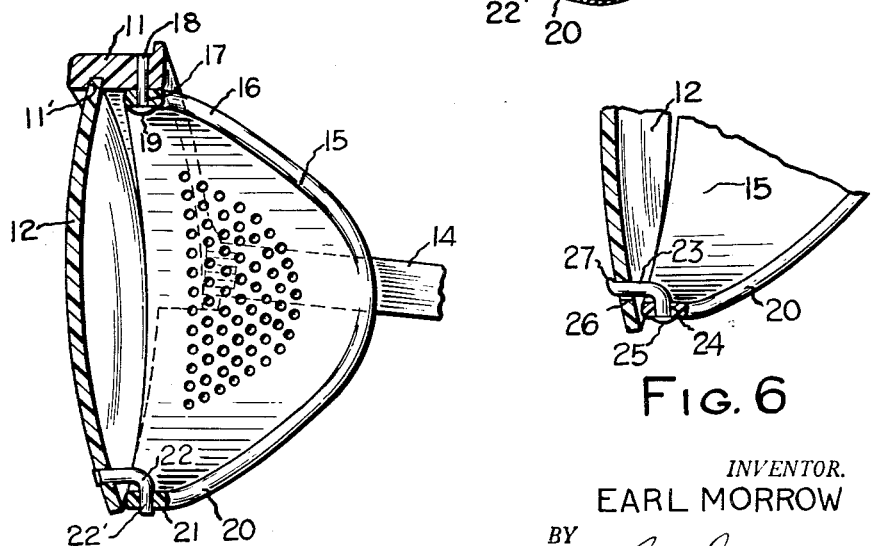
INVENTOR.
EARL MORROW
BY
*J. A. Ellestad*
ATTORNEY

United States Patent Office 2,715,224
Patented Aug. 16, 1955

2,715,224

GOGGLES WITH LENS MOUNTED SIDE SHIELDS

Earl Morrow, Rochester, N. Y., assignor to Bausch & Lomb Optical Company, Rochester, N. Y., a corporation of New York Application March 27, 1953, Serial No. 345,011

4 Claims. (Cl. 2—14)

This invention relates to an improved goggle and more particularly it has reference to a novel means for fastening a side shield on a goggle.

In a type of goggle now in wide commerical use, a plastic lens member is supported along its upper edge portion by a brow bar. The lens member has no frame around the lower portion of the lens and hence it is not possible to pivotally mount the lower part of a side shield in the customary manner.

The principal object of my invention is to provide a novel means for fastening a side shield on a goggle of the above noted type.

Another object of my invention is to provide a goggle with a novel means for pivotally mounting a side shield on the lens of the goggle.

A still further object of my invention is to provide a goggle with novel means for mounting the side shield on the lens that will be simple to make and assemble.

Other objects and advantages pertaining to the construction of the device and to the form and relation of parts thereof will more readily appear from the following description taken in connection with the accompanying drawings, in which:

Fig. 1 is a rear view of a goggle embodying my invention.

Fig. 2 is a perspective view from the rear of the goggle showing one side shield in assembled position.

Fig. 3 is a sectional view taken through a temporal portion of the brow bar showing the means for attaching the lens.

Fig. 4 is a cross-sectional view on line 4—4 of Fig. 3.

Fig. 5 is a cross-sectional view along line 5—5 in Fig. 1.

Fig. 6 is a sectional view of one modification of my invention.

A preferred embodiment of my invention is shown in Figs. 1–3 of the drawings wherein a goggle or eyeshield 10 has a flexible brow bar 11 extending only along the upper portion and partially down the temporal portions of a one-piece transparent lens member 12 which has a reentrant section in the central portion for receiving a nose rest 13 depending downwardly from the brow bar 11. The lens member 12, having no frame or rim around its lower portion, is adapted to be supported along its upper edge portion in a groove 11' in the brow bar and is held therein by the coaction between the recesses 10' in the temporal portions of the brow bar and the lateral projections 12' on the lens 12. When it is desired to remove the lens member 12 from the goggle it is a simple matter to spread the temporal portions of the brow bar 11 so as to release the projections 12' on the lens from the recesses in the brow bar whereby the lens is removed from the goggle. Pivotally attached to the temporal edge portions of the brow bar 11 is a pair of temples 14 which extend rearwardly therefrom.

Pivotally attached along the temporal portions of the goggle and shaped to substantially conform to the edge portions of the lens member 12 is a side shield 15 which has an upper part 16 having an aperture 17 therein for receiving a pin 18 projecting from the bar member 11 whereby the upper part of the side shield is pivotally mounted on the bar member. The pin 18 has a head 19 on its lower end for holding the side shield on the pin.

Carried by the lower portion of the lens member 12 and projecting in a rearward and downward direction is an L-shaped pin or bracket 22 which has its terminal end 22' adapted to be detachably received in an aperture 21 in the lower part 20 of the side shield 15. The pin or bracket 22 can be made in any suitable shape and can be fastened on the lower portion of the lens member 12 in any suitable fashion. The lower part 20 of the side shield 15 is biased toward the center of the lens by the resiliency of the side shield whereby the part 20 is held in engagement with the lower end 22' of the pin 22 when the pin is received in the aperture in the side shield. The side shield 15 is free to pivot about the pins 18 and 22 into inoperative position against the lens or into operative position along the temple 14 as shown in Fig. 2.

When it is desired to replace a lens member 12, the side shields 15 are unhooked from the pins 22 and the lens is removed in the manner above described. A new lens member 12 is fastened on the brow bar 11 and the pin 22 on the lens 12 is then inserted into the aperture 21 in the lower part 20 of the side shield whereby the goggle is once again ready for use.

Fig. 6 shows a modification of my invention wherein the lower part 20 of the side shield 15 has a bracket or pin 23 secured in an aperture 24 by a head 25 on the pin. The pin 23 extends in an upward and outward direction and is adapted to be detachably received in an aperture 26 in the lower portion of the lens 12 by the action of an offset 27 on the pin engaging with the outer periphery of the aperture 26 to thereby mount the side shield on the lens. In this embodiment, when a lens 12 is to be replaced, the pin 23 with attached side shield 15 is withdrawn from the aperture 26 in the lens after the offset 27 is disengaged from the lens. The lens can then be removed and cleaned or replaced.

It should be understood that the specific goggle here disclosed is not part of the invention. Any goggle of the type which has no frame around the lower portion of the lens and wherein a side shield is to be attached to the lens is to be understod to be within the purview of this invention.

From the foregoing, it will be apparent that I am able to attain the objects of my invention and provide an improved type of goggle. The side shield 15 is made of flexible plastic and is moulded to the proper shape so that the flexibility of the shield will act against the pins to hold the side shield in place. The side shields are easily attached and detached from the lens without requiring the use of any tools. Various modifications may obviously be made without departing from the spirit of my invention as pointed out in the appended claims.

I claim:

1. In a goggle, the combination of a lens, a brow bar extending only along the upper portion of the lens, means for attaching the lens to the brow bar, a side shield, means for pivotally mounting the upper part of the shield to the brow bar, and means for pivotally mounting the lower part of the shield on the lens comprising a bracket mounted in an aperture in the lower portion of the lens for pivotally supporting the lower part of the shield.

2. In a goggle, the combination of a lens, a brow bar extending only along the upper portion of the lens, means for mounting the lens on the brow bar, a side shield, means for pivotally mounting the upper part of the side shield on the brow bar, and bracket means carried solely by the lower portion of the lens and having rearwardly and downwardly extending portions, the lower part of said side shield being pivotally mounted on the downwardly extending portion of the bracket means, whereby the side shield is pivotally mounted on the goggle.

3. In a goggle, the combination of a lens having an aperture in the lower portion thereof, a brow bar extending only along the upper portion of the lens, means for mounting the lens on the brow bar, a side shield, means for pivotally mounting the upper part of the side shield on the brow bar, and a bracket having one end mounted in said aperture in the lens, the lower part of said shield being pivotally mounted on the other end of said bracket whereby the side shield is pivotally mounted on the goggle.

4. In a goggle having a lens supported at its top edge by a brow bar, and a side shield having its upper end pivotally mounted on the brow bar so that the shield will lie substantially along the temporal edge of the lens, the combination of coacting means on the lower adjacent portions of the side shield and lens for pivotally supporting the lower part of the side shield on the lens, said means comprising an L-shaped bracket having a rearwardly extending part mounted in an aperture formed in the lower portion of the lens and a downwardly extending part positioned in an aperture formed in the lower part of the shield whereby the shield is pivotally mounted on the goggle.

References Cited in the file of this patent

UNITED STATES PATENTS

| | | |
|---|---|---|
| 2,229,342 | Rux | Jan. 21, 1941 |
| 2,529,110 | Splaine | Nov. 7, 1950 |

FOREIGN PATENTS

| | | |
|---|---|---|
| 397,256 | Great Britain | Aug. 24, 1933 |